Sept. 25, 1923.
G. C. CHASE
1,468,992
CALCULATING MACHINE
Filed May 12, 1922
8 Sheets-Sheet 1
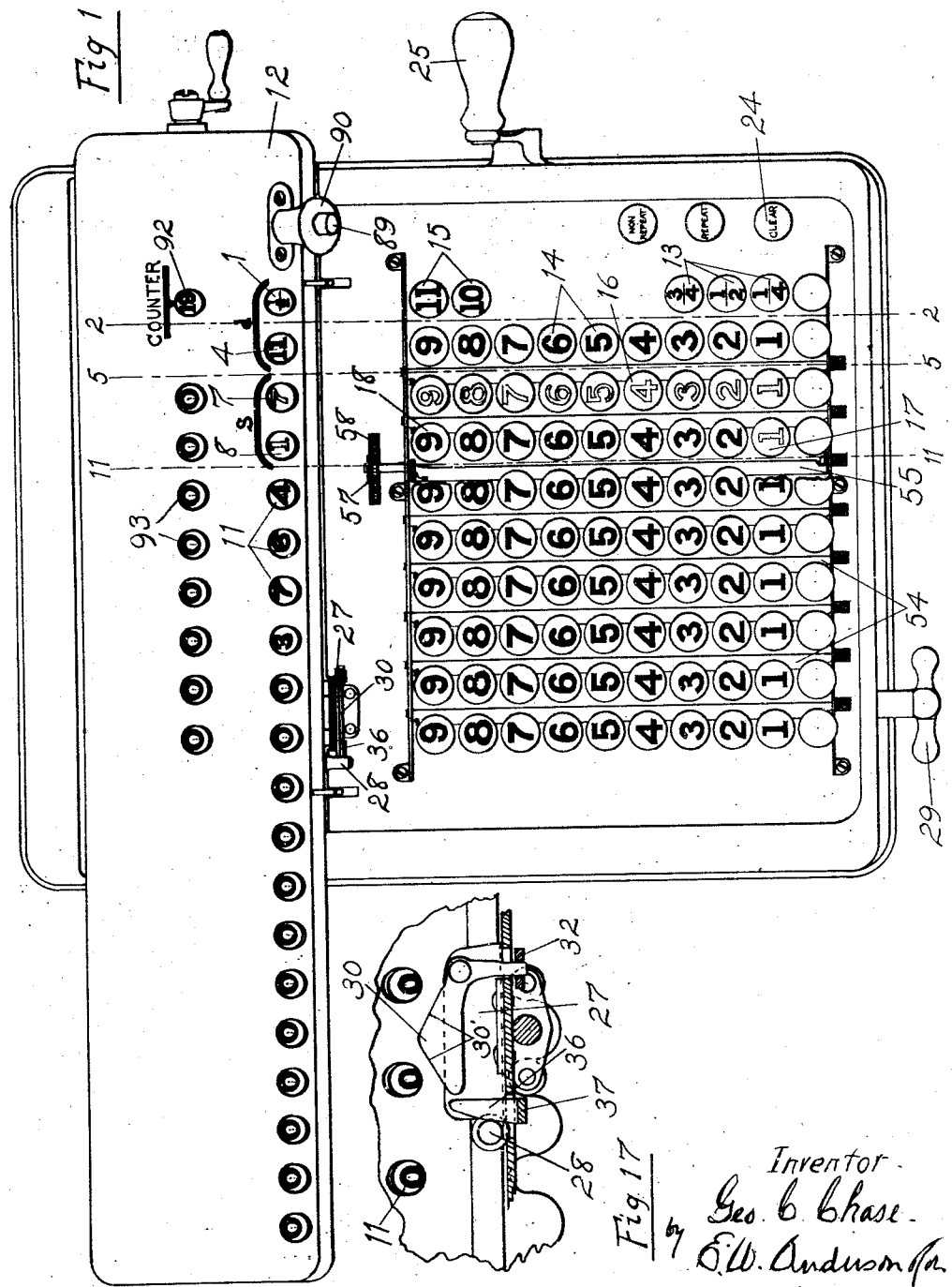

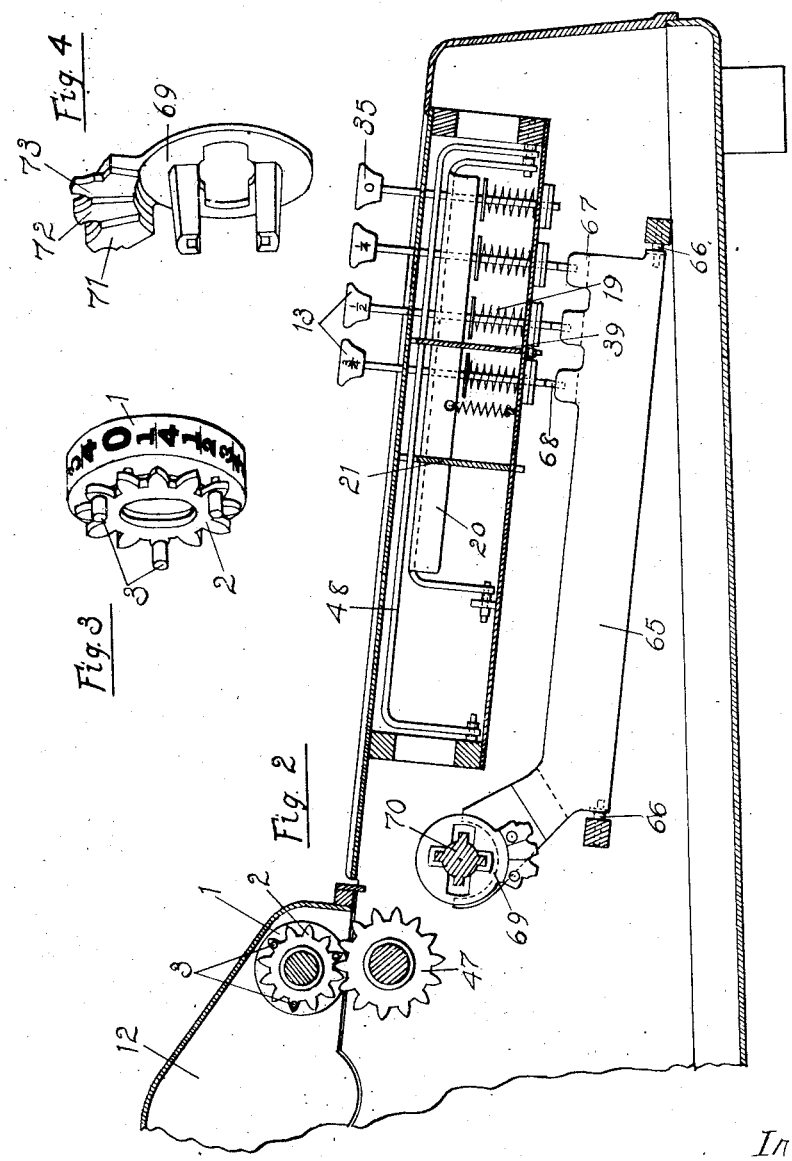

Sept. 25, 1923.
G. C. CHASE
1,468,992
CALCULATING MACHINE
Filed May 12, 1922   8 Sheets-Sheet 3
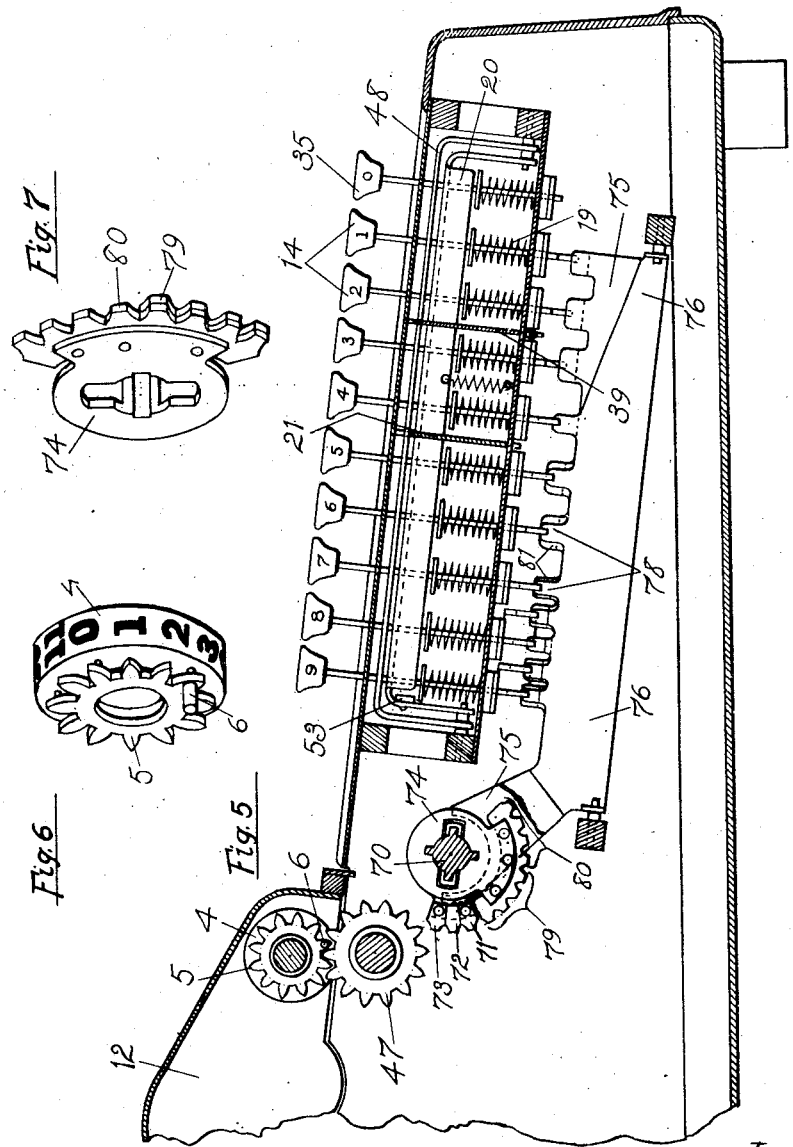

Sept. 25, 1923.                G. C. CHASE                    1,468,992
                           CALCULATING MACHINE
                         Filed May 12, 1922        8 Sheets-Sheet 4
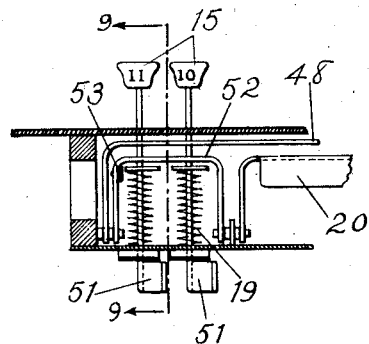
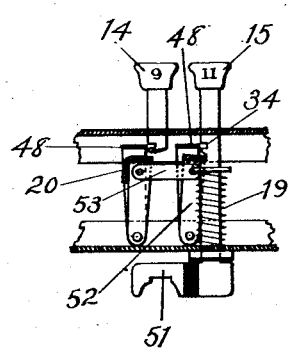
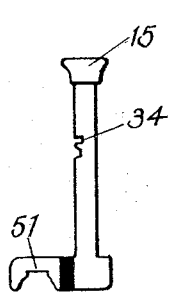
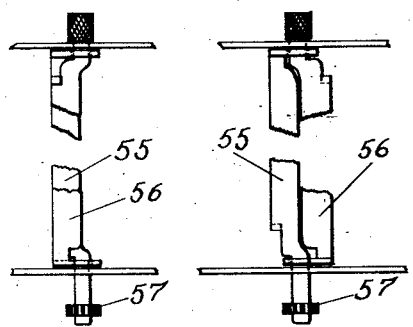
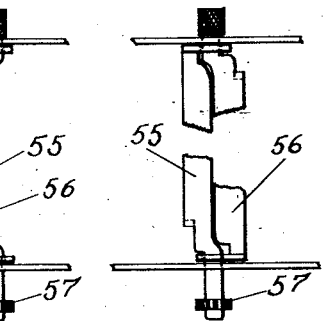
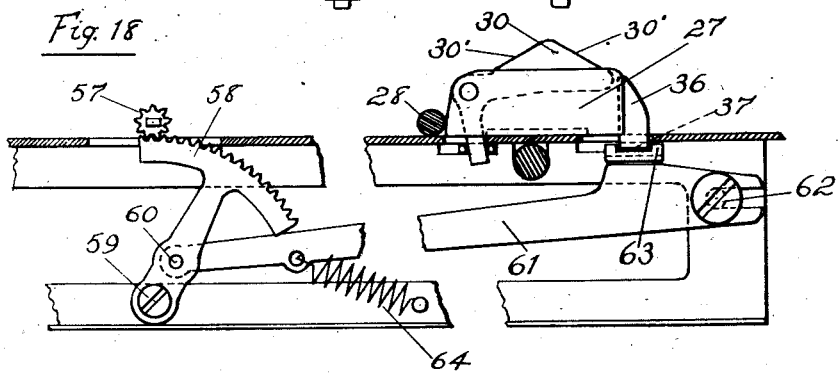
Inventor-
Geo. C. Chase.
by E. W. Anderson Jr.
Attorneys Sept. 25, 1923.
G. C. CHASE
CALCULATING MACHINE
Filed May 12, 1922  8 Sheets-Sheet 5
1,468,992
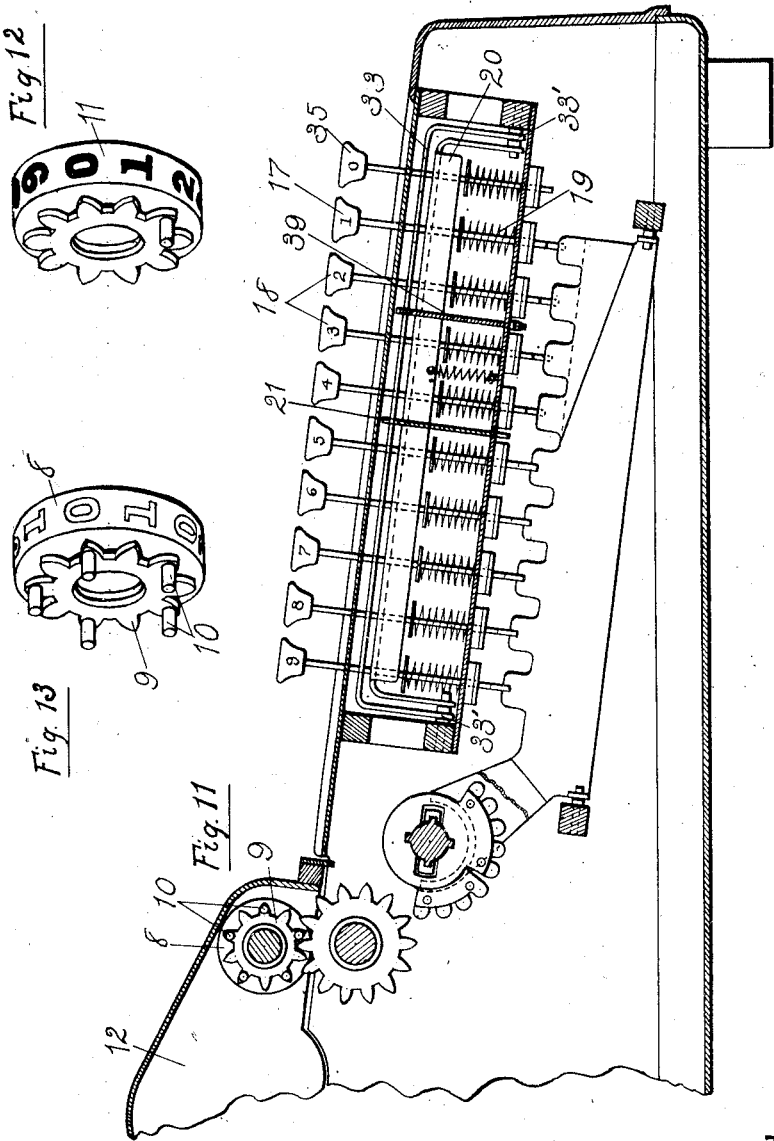
Inventor·
Geo. C. Chase.
by E. W. Anderson
Attorney

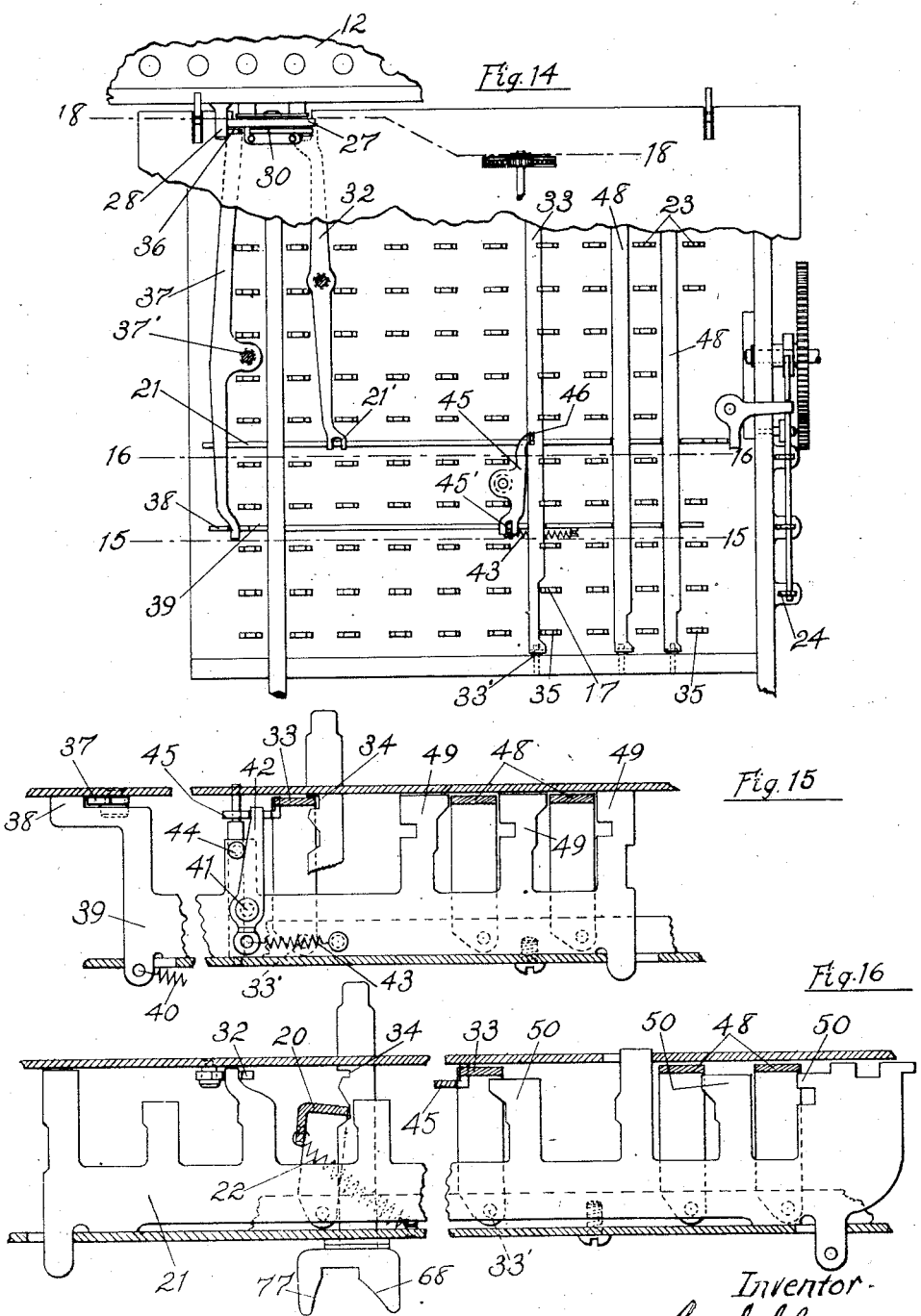

Sept. 25, 1923.  G. C. CHASE  1,468,992
CALCULATING MACHINE
Filed May 12, 1922   8 Sheets-Sheet 7

Inventor:
Geo. C. Chase.
by E. W. Anderson & Son
Attorneys.

Sept. 25, 1923.  G. C. CHASE  1,468,992
CALCULATING MACHINE
Filed May 12, 1922   8 Sheets-Sheet 8

Inventor.
Geo. C. Chase
by E. W. Anderson
Attorneys.

Patented Sept. 25, 1923.

1,468,992

UNITED STATES PATENT OFFICE.

GEORGE C. CHASE, OF SOUTH ORANGE, NEW JERSEY, ASSIGNOR TO MONROE CALCULATING MACHINE COMPANY, OF NEW YORK, N. Y., A CORPORATION OF NEW YORK.

CALCULATING MACHINE.

Application filed May 12, 1922. Serial No. 560,359.

*To all whom it may concern:*

Be it known that I, GEORGE C. CHASE, a citizen of the United States of America, resident of South Orange, in the county of Essex and State of New Jersey, have made a certain new and useful Invention in Calculating Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

This invention relates to a calculating machine adapted for British currency or fractional calculations and also adapted for independent use for decimal calculations.

The objects of this invention are:

1. The provision of an adding, subtracting, multiplying and dividing machine embodying product wheels, varying groups of which may be brought under control of the selecting mechanism, and providing registering mechanism embodying devices adapted to different systems of numeration.

2. The provision of a calculating machine as above set forth whereby any calculation involving addition, subtraction, multiplication, or division of a British currency or other fractional value, may be optionally performed by either of two methods, the decimal method, or the fractional method, the latter involving the use of mixed denominators.

3. The provision of a machine wherein certain banks of keys may be used for both decimal and fractional calculations.

4. The provision in an adding, subtracting, multiplying and dividing machine of means for setting the machine before commencing a calculation so that it will be adapted for British currency or other fractional calculations, or for alternatively setting the machine to accomplish the usual decimal caluculations.

5. The provision of means to release all depressed keys as machine is shifted from fractional to decimal, or from decimal to fractional registering position.

6. The provision of means whereby fractional keys not used in decimal calculations may be locked when the carriage is shifted to bring the lowest order decimal wheel into decimal calculating position.

7. The provision of means whereby certain keys not used in fractional calculations may be locked when the carriage is shifted to fractional calculating position from position with the lowest order decimal wheel in decimal calculating position.

8. The provision of means for preventing a fractional numeral wheel from being shifted from the control of one order of selecting members to another.

9. The provision of means which safeguard against accidental displacement of the mechanism from decimal registering position into fractional registering position.

10. The provision of means for automatically placing a decimal marker whenever the machine is set for fractional calculations and automatically eliminating that decimal indication whenever the mechanism is moved out of fractional registering position.

11. The provision of fractional actuating mechanism which will receive inoperative decimal registering mechanism into engagement with said fractional actuating mechanism when standing in normal position of rest.

In addition to the above novel results, several constructional features of the invention will be apparent from the following specifications and claims. A sufficient description of the operation of this machine is given at the end of the specifications to illustrate the manner in which any calculation involving addition, subtraction, multiplication or division of a British currency or other fractional sum may be carried out by either of two methods, the decimal method or the fractional method. It will be apparent from that description that in some cases the fractional method is very preferable, whereas in other cases the decimal method is preferable. This machine therefore embodies for the first time a construction which permits the operator to optionally select the method of calculation which will be the easiest for the solution of the problem in hand.

The appended claims should therefore be interpreted broadly to cover all equivalent means for accomplishing these novel results.

The term "fractional calculation" is used in this application as commonly understood in the art, being one involving fractions having different denominators, as $\tfrac{1}{10}$ and $\tfrac{1}{12}$. Fractions having like denominators, as $\tfrac{1}{10}$ and $\frac{1}{12}$, could be handled on a machine resembling a decimal machine and provided with a shiftable carriage. The description refers to British currency fractions, wherein four farthings amount to one penny, twelve pence amount to one shilling, and twenty shillings amount to one pound, but it will be understood that the spirit of the invention covers an almost infinite number of other fractional combinations.

The invention consists in the novel construction and combination of parts as hereinafter set forth.

In the accompanying drawings, illustrating an embodiment of the invention as applied to calculating machines of the general type and character disclosed in United States Patents (Reissue) No. 13,841; No. 1,306,606; No. 1,384,634, and application Serial No. 426,043:

Figure 1 is a top plan view of the machine as set for British currency calculations.

Figure 2 is a section on line 2—2 of Figure 1, showing the farthings registering mechanism.

Figure 3 is a detail perspective view of the farthings numeral wheel.

Figure 4 is a detail perspective view of the farthings selector gear.

Figure 5 is a section on line 5—5 of Figure 1, showing the pence registering mechanism.

Figure 6 is a detail perspective view of the pence numeral wheel.

Figure 7 is a detail perspective view of one of the pence selector gears.

Figure 8 is a sectional view, on line 8—8 of Figure 1, showing the ten and eleven pence keys.

Figure 9 is a section on line 9—9 of Figure 8, showing the nine and eleven pence keys.

Figure 10 is a detail side view of a ten or eleven pence key.

Figure 11 is a section on line 11—11 of Figure 1, showing mechanism which may be used for decimal registrations or for the registration of ten shillings.

Figure 12 is a detail perspective view of a decimal numeral wheel.

Figure 13 is a detail perspective view of the tens of shillings numeral wheel.

Figure 14 is a plan view of the keyboard, with the key buttons removed and the key plate broken away to show the new key locking and releasing mechanism.

Figure 15 is a section on line 15—15 of Figure 14, showing details of the mechanism for releasing and locking the farthings, pence and certain of the decimal keys.

Figure 16 is a section on line 16—16 of Figure 14, showing means whereby depressed keys are released when the machine is shifted from decimal to British currency position, or vice versa.

Figure 17 is a front view of the carriage positioning bridge and associated parts.

Figure 18 is a section on line 18—18 of Figure 14, showing a rear view of the carriage positioning bridge with its associated mechanism and the automatic keyboard marker.

Figures 19 and 20 are plan details of the automatic keyboard marker.

*Numeral wheels and keyboard.*

Figure 21:
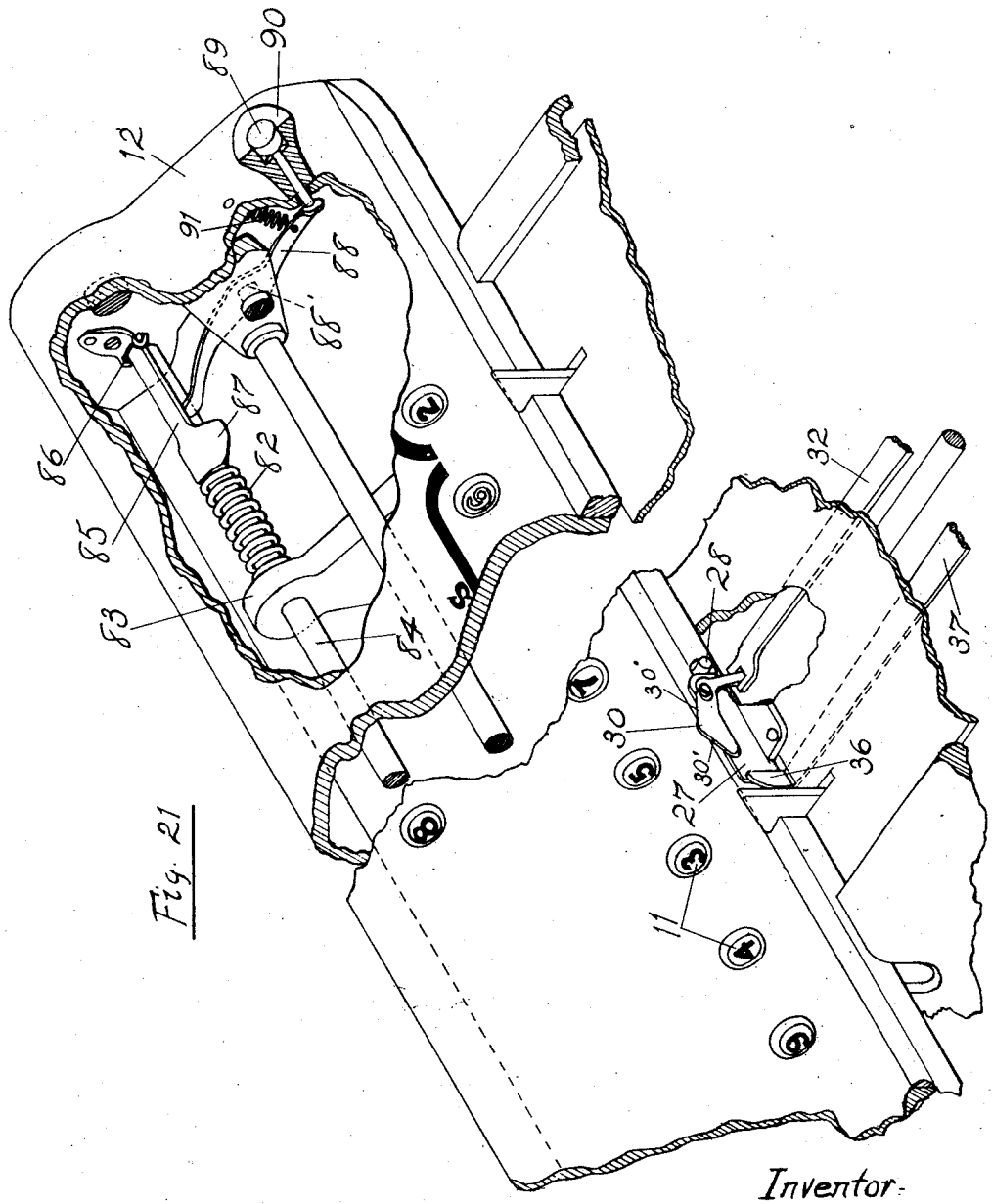
Figure 21 is a fragmentary perspective view of the rear portion of the machine, with casing broken away to show mechanism for placing the carriage in British currency position, also showing details of Brtish currency positioning bridge and associated parts.
Figure 22:
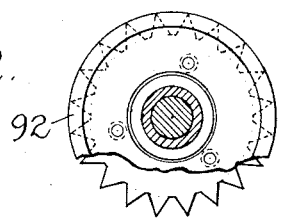
Figure 22 is a detail side view, partly broken away, of the British currency counting wheel and associated parts.
Figure 23:
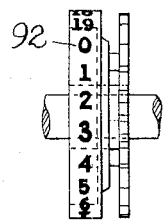
Figure 23 is an edge view of the same.
Figure 24:
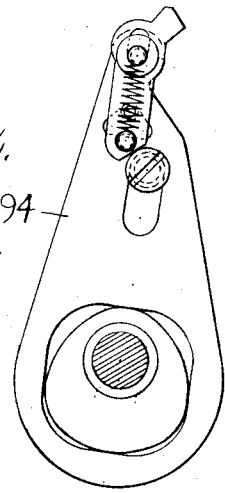
Figure 24 is a detail side view of the cam and counting finger used to drive the counting wheels.
Figure 25:
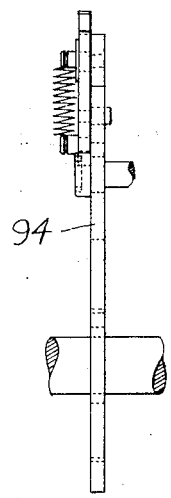
Figure 25 is an edge view of the same.

In these drawings, Figure 1 shows a plan view of a twenty numeral wheel calculating machine, adapted for British currency calculations as specified. This machine may be characterized as a key-set reversible crank-operated reversible - numeral - wheel calculator, having numeral wheels adapted to be shifted transversely relative to the keyboard or selector mechanism. The machine is adapted for performing addition in the usual manner, and is further adapted for subtraction because the numeral wheels are directly reversible for negative registration; for multiplication because the numeral wheels are shiftable with relation to the selecting mechanism and because of the provision of other numeral wheels which register the multiplier; and finally, the machine is adapted for division because the numeral wheels are both shiftable and reversible and because of the provision of numeral wheels for registering the quotient. The four right-hand numeral wheels are adapted for British currency calculations, or for twentieths, twelfths and fourths.

The farthings numeral wheel 1 (Figures 1, 2 and 3) is provided with three sets of numerals, each set having four figures, namely $\frac{1}{4}$, $\frac{1}{2}$, $\frac{3}{4}$ and 0, and has twelve gear teeth 2 and three carry tripping pins 3. The number of sets of figures and carry tripping pins may be varied if desired. The pence numeral wheel 4 (Figures 1, 5 and 6) is provided with one set of twelve figures, namely the nine digits and ten, eleven and 0, and like the farthings wheel 1 has twelve teeth. This pence wheel gear is provided with one carry tripping pin 6. The units of shillings numeral wheel 7

(Figure 1) is provided with one set of ten figures, namely one to nine, inclusive, and 0, and has ten gear teeth and one carry tripping pin, being precisely like the decimal numeral wheels 11 (Figure 12), except that it may be desirable to give the figures of the units of shillings wheel a distinctive color. The tens of shillings wheel 8, the fourth numeral wheel from the right (Figures 1, 11 and 13) is provided with five sets of figures, each set having two numerals, namely one and 0 and the gear of this wheel has ten teeth and five carry tripping pins 10. The other or higher numeral wheels 11 (Figure 12), which are located at the left of these fractional numeral wheels, are of the usual character. Whenever any of these numeral wheels arrive at 0 the next higher numeral wheel will be advanced one step, by carry mechanism as disclosed in said patents.

The four fractional numeral wheels at the right-hand designated 1, 4, 7 and 8, function only when the carriage 12 (Figure 1) is shifted to its extreme left-hand position which position will be hereinafter designated as "British currency position" or "fractional position." All other positions of the carriage will be known as "decimal positions." With the carriage in British currency position, the farthings numeral wheel is in vertical alignment and functions with the farthings keys 13 (Figures 1 and 2). The pence numeral wheel 4 aligns with the one to nine pence keys 14 (Figures 1 and 2). For convenience the ten and eleven pence keys 15 are placed in vertical alignment with the farthings keys, but operate in conjunction with the pence wheel 4. The units of shillings wheel 7 and the tens of shillings wheel 8 align with the units of shillings keys 16 and the ten shillings key 17 respectively, the latter being also the first of the tens decimal keys. Whenever the carriage is located in a decimal position, the units of shillings keys 16 and the ten shillings key 17, with the other (lockable) tens decimal keys 18, cooperate with decimal numeral wheels 11 (Figure 1). When the carriage is in British currency position, the (lockable) tens decimal keys 18 have no function to perform, because they are located in the column with the ten shillings key, and as nineteen shillings is the maximum capacity of the shillings numeral wheels and as the tens of shillings numeral wheel is provided with the figures 1 and 0 in a plurality of sets, none of the (lockable) tens decimal keys 18 could function properly with the tens of shillings numeral wheel 8, because if said keys 18 were functioning, more than one carry operation should take place from the tens of shillings wheel 8 to the next higher wheel during the period of one crank revolution, and the carry mechanism disclosed is capable of registering but one carry operation between any two numeral wheels during one crank revolution.

Therefore means are provided whereby the (lockable) tens decimal keys two to nine, inclusive, may be locked in their normal (raised) position at all times when the carriage stands at British currency position. It is apparent that in order to lock said keys in their normal raised position, any (lockable) tens decimal key 18 which is in depressed position must be first released, so that it may be raised by its spring, the same being true of any fractional key which it is desirable to lock when the carriage is in decimal position, and to this end the following means are provided:

*Key releasing mechanism.*

All of the keys of the machine are provided with springs 19 which act to raise the keys to their normal position, and each column of keys is provided with a universal bar 20, commonly known as a flexible keyboard lock bar (Figures 2, 5, 11, 8, 9 and 16), these bars serving to retain the keys in depressed position and being operated to release the keys so that the latter may be raised to normal position by their springs. A keyboard release bar 21, (Figures 14, 16, 2, 11 and 5) is common to all of the bars 20 and extends at right-angles thereto, transversely of the machine, and is normally held in position at the limit of its movement to the right (Figure 16) by the springs 22 of the bars 20. Movement of the keyboard release bar 21 to the left will withdraw all of the bars 20 from engagement with the notches 34 of the key stems, thereby releasing the keys, which will be raised to normal position by their springs, all as disclosed in said patents. The keyboard release bar 21 is disclosed in the prior art as operable from two different sources, namely by depression of the clear key 24 (Figures 14 and 1) and also at the end portion of the revolution of the crank handle when the appropriate devices are set in non-repeat position. I now add to these two means of operating the keyboard release bar, a third means, which functions whenever the carriage 12 is shifted to or from British currency position.

In so shifting the carriage it is necessary that it shall be moved a minimum distance of two steps, i. e., twice the space between the numeral wheels, because the right-hand decimal wheel 11 must be in alignment with the units of shillings keys 16, which function as decimal keys, whenever the carriage is in the extreme left-hand decimal position. A carriage-positioning bridge 27 (Figures 21, 14, 1 and 18) is mounted rigidly on the keyboard frame and cooperates with a carriage-positioning pin 28 fixed on the carriage 12. The position of these parts is such that the carriage must be raised to permit the carriage-positioning pin to pass from one side to the other of the bridge, the length of the carriage-positioning bridge being sufficient to hold the carriage in its inoperative raised position while being shifted two spaces in either direction, to British currency position or to decimal position, as the case may be.

This bridge also prevents the carriage from being moved by operation of the carriage-shifting knob 29 (Figure 1) to the right, out of British currency position, or to the left, out of decimal position, since said knob is incapable of lifting the carriage sufficiently to permit carriage-positioning pin 28 to clear bridge 27. Thus erroneous movement of the carriage by knob 29 is avoided, this being particularly important during decimal calculations, when the carriage is being shifted in the well known manner.

Bridge 27 also provides a rigid support for the lever 30, fulcrumed thereon (Figures 1, 18, 14 and 21) one arm of this lever being extended horizontally and provided on its upper edge with oppositely inclined cams 30'. The U. S. Patent No. 1,384,634 referred to, discloses means for limiting the extent to which the carriage 12 may be raised as it is shifted transversely, and the carriage positioning pin 28 is thus compelled to engage with one or the other of said cams, to actuate said lever, as the carriage is shifted in one or the other direction. The cam lever 30 has a downwardly extending arm engaging a slot of the key-releasing lever 32 (Figures 21, 14 and 16). This key-releasing lever is fulcrumed about midway of its length to the keyboard frame, and at its forward end has engagement at 21' with the keyboard release bar 21. Therefore, whenever the carriage is shifted to or out of British currency position the key-board release bar 21 is moved to the left and all of the keys of the keyboard are released and restored to normal position by their springs.

This automatic releasing and locking of the keys is readily accomplished, owing to the use of the selector mechanism common to the two systems of calculation, since, were these absent, the fractional calculating position of the carriage would be identical with the proper position for decimal registration in the lowest order.

*Locking mechanism for decimal keys.*

Means are provided as follows to lock the tens decimal keys two to nine, inclusive, in their normal raised position at all times when the carriage stands at British currency position (Figure 14), the reason for this locking having been already explained:

A rock bar 33, constituting a decimal key lock, extends the entire length of the tens decimal keys (Figures 14, 15, 16 and 11), and is pivoted at its ends to the framing at 33', the key stem notches 34 of the tens decimal keys two to nine, inclusive, being engaged by said rock bar, as will be explained, to thereby lock said keys in their normal raised position. This decimal key lock is cut away at one end, so that it will not engage with the notch 34 of the ten shillings key 17 and to avoid interference with the stem of the column release or zero key 35.

The key locking lever 37 is fulcrumed about midway of its length to the framing, at 37', and its forward end is located adjacent to an upstanding projection 38 (Figures 14 and 15) of the left-hand end of the reciprocatory key-locking bar 39 (Figures 14, 15, 11, 5 and 2), the latter being provided with a spring 40.

The key-locking bar 39 has an operating connection with the decimal key lock 33, consisting of a lever 42 fulcrumed to the bar 39 upon stud 41 and provided with a spring 43 connected to its lower or tail arm and tending to move its upper arm to the left against a stop 44 carried by an upward extension of the bar 39, said upper arm engaging a slot 45' of the forward end of movement-reversing lever 45, the latter being fulcrumed to the framing and the rear end thereof having an upstanding lug engaging a slot 46 of the decimal key lock 33.

The spring 40 normally holds the key-locking bar 39 at the limit of its movement to the right, thereby through the connection stated holding the decimal key lock 33 in released position, out of engagement with the notches 34 of the stems of the (lockable) decimal keys 18, and also through engagement of its projection 38 with the lever 37, normally positioning the cam edge of the upturned rear end of said lever so that it will be encountered by the carriage-positioning pin 28 whenever the carriage is shifted into British currency position.

The carriage being so shifted to British currency position, past the bridge 27, will thereupon fall to normal position to engage the numeral wheel gears with the intermediate gears of the machine, and at the same time the carriage-positioning pin in falling will engage the cam end 36 of the lever 37 and actuate said lever, the result being that the decimal key lock or rock bar 33 will be moved into engagement with the notches 34 of the (lockable) tens decimal keys 18, to lock the same in normal raised position. In this operation the lever 42 acts as a rigid extension of the key-locking bar 39, but is capable of yielding under strain as will now be explained, in order to avoid injury to the machine, i. e., in case any (lockable) tens decimal key 18 should be inadvertently held depressed by the operator at the time the cam lever 30 is operated by the carriage-positioning pin 28 to clear the keyboard, the rock-bar 20 engaging the key stem notch 34 will continue to hold said key depressed, and the decimal key lock 33 will be held from entering any of the notches 34 of the (lockable) tens decimal keys 18. The decimal key lock is permitted to remain in normal released position owing to the yielding of the lever 42 against the tension of its spring, whereby the usual movement of the key-locking bar 39 is allowed but the lever 42 is not operated to transmit movement therefrom to the reversing lever 45. The key so held depressed is now released by operation of the clear key 24, whereupon the bar 33 will be operated by the lever 42, under the influence of its spring 43, to engage with the notches 34 of the (lockable) tens decimal keys 18 and lock them in their normal raised position.

*Locking mechanism for fractional keys.*

The pence and farthings keys are rendered inoperative whenever the carriage is moved from British currency to a decimal position, by locking them in their normal raised position. The ten-tooth gears of the units of shillings wheel 7 or the tens of shillings numeral wheel 8, or of the higher decimal wheels 11, may mesh with the intermediate farthings and pence driving gears 47 (Figures 2 and 5). These latter gears are shown as provided with the same number of teeth as the intermediate gears for the decimal wheels, although the number of teeth may be varied. Rotation of the farthings and pence intermediate driving gears, however, when in engagement with any numeral wheels other than the farthings and pence numeral wheels respectively, would lead to confusion, and it is for this reason that the pence and farthings keys are rendered inoperative when the carriage is in any decimal position.

This locking of the pence and farthings keys is accomplished by the above-described movement of the key-locking bar 39, brought about by engagement therewith of the carriage-positioning pin 28.

Two rock-bars 48 (Figures 14, 15, 16, 2 and 5) constituting fractional key locks, are pivoted at their ends to the framing and are moved in unison to engage the key stem notches 34 of the pence and farthings keys whenever the carriage is moved out of British currency position. The right-hand bar 48 engages the notches of the farthings keys and the ten and eleven pence keys, and the left-hand bar 48 engages the notches of the one to nine pence keys, it being obvious, however, that this arrangement could be varied if desired. The fractional key locks or bars 48 are cut away at the forward ends, to provide clearance from the stems of the column release keys 35 of the farthigs and pence denominations.

Referring to Figure 15 it will be noted that the key locking bar 39 has three unstanding extensions 49, one of which is located closely between the bars 48 and the other two of which are located close to the bars 48 at the outer sides thereof, so that any movement of the key-locking bar 39 in either direction will be at once directly and positively communicated to the bars 48. Whenever the carriage is shifted into British currency position the bar 39 will be moved to the left and the fractional key locks 48 will be moved therewith, out of engagement with the notches 34 of the pence and farthings keys (Figures 9 and 10). Per contra, whenever the carriage is shifted away from British currency position the spring 40 will retract the bar 39 to the right and restore the engagement of the fractional key locks 48 with the notches 34 of the pence and farthings keys. And in the event that at this time any of these farthings or pence keys should be in depressed position, and so held by the bar 20 engaging the key stem notches thereof, the cam lever 30 will be operated by the carriage-positioning pin 28 to release all depressed keys following the release of the key-locking bar 39, and these depressed keys will be returned to normal raised position by their springs and locked as stated, notwithstanding the friction of the key-locking bars 48 against the edges of said depressed keys, owing to the fact that the spring 40 is of necessity not strong enough to prevent the raising of the keys by their springs.

The decimal key lock 33 and the fractional key locks 48 are not of very rigid construction, because of lack of space in their immediate vicinity, and in order to provide the necessary rigidity to these parts, so that they shall not bend when a key that may have been thereby locked is forced downwardly thereagainst, the keyboard release bar 21 is provided with three upstanding extensions 50 (Figure 16) which normally underlie and brace the parts 33 and 48.

The ten and eleven pence keys are located in vertical alignment with the farthings keys, to the right of the eight and nine pence keys (Figure 1), and in order that the ten and eleven pence key stems shall actuate the same selector rock-bars 75 and 76 as do the one to nine pence keys, the former key stems are provided with lower lateral extensions 51, which are long enough for the purpose stated but are offset sufficiently so as not to interfere with the corresponding parts of the eight and nine pence keys.

The flexible keyboard lock-bar 20 for the farthings column is shorter than are the similar bars 20 of the higher columns (Figure 2). The short flexible keyboard lock-bar 52 for the ten and eleven pence keys must operate in unison with the flexible keyboard lock-bar 20 for the one to nine pence keys, and to this end the said parts 20 and 52 are pivotally connected by a link 53 (Figures 9, 8 and 5), the result being that the ten and eleven pence keys may be cleared or released by the depression of any other of the pence keys or by the pence column release key 35.

*Automatic keyboard marker for pounds.*

When the carriage is shifted to British currency position the keyboard marker or decimal point marker should stand between the ten shillings key 17 and the next higher column, and means are provided to automatically turn up a decimal marker at the place stated whenever the carriage is so shifted to British currency position, and to automatically turn down said marker whenever the carriage is moved out of British currency position (Figures 1, 18, 19 and 20).

A manually operable decimal marker 54 is located between each column of keys at the left of the pence keys except between the ten shillings key 17 and the next higher column, where there is provided a marker 56, similar to the markers 54, and a second decimal marker 55, these two markers being adapted to overlie or underlie each other and to be turned from over or upon each other. The decimal markers 54, 55 and 56 are merely strips of metal, dark colored on one side to merge with the keyboard color and of a contrasting or light color on the other side, and are pivotally mounted to move through an arc of 180°, to expose the light colored side for a decimal marker or the dark colored side so the color thereof will merge with the color of the keyboard.

The decimal markers 55 and 56 (Figures 19 and 20) are provided respectively at opposite ends with aligned pivot extensions having bearings in upstanding forward and rear keyboard strips, and are also provided respectively at opposite ends each with a lateral extension pivotally engaging the pivot extension of the other marker, whereby the markers pivot upon a common axis and either marker may be moved pivotally 180° independently of the other marker. The rear end of the marker 55 is provided with a pinion 57 meshing with a segment 58, the latter being pivoted to the framing stud 59 and having a connection with the key-locking lever 37, consisting of a horizontally reciprocatory link 61 having at one end pivotal engagement with a stud 60 of said segment and at its other end (which has supporting sliding engagement with a stud 62 of the framing) having a forked or grooved upward extension 63, straddling the rear end of lever 37. A spring 64 for the link 61 normally positions the parts so that the marker 55 has its dark side uppermost.

Whenever the carriage moves to British currency position and the lever 37 is actuated as has been explained, the operation of link 61 and segment 58 will act automatically to move the marker 55 one half turn, thereby displaying the light colored side thereof. And in case the associated marker 56 shall, previous to said operation of the marker 55, have been located upon marker 55 with its light colored side uppermost, both of said markers would have been flipped over, thereby leaving the marker 55 uppermost, with its light colored side exposed. When the carriage is moved away from British currency position, the marker 55 will be automatically flipped back to non-marking position, the associated marker 56 being not disturbed.

In connection with the proper decimalization of the keyboard, the following color scheme is used to properly distinguish the keys:

The farthings keys may be of one color and all of the pence keys another color, but it seems desirable that the shillings keys and the pounds keys shall be of the same color, inasmuch as in decimal calculations there is no distinction between the shillings keys and the units of pounds keys, as they both function in the usual units, tens and hundreds orders of the decimal system. It is desirable, however, that the shillings keys shall be distinguishable, and to this end the color of the inserted value figures of the units column of shillings keys and the ten shillings key is made distinctive from the color of the inserted value figures of the keys above and at the left of the shillings keys.

*Fractional selector gear.*

Reissue Patent No. 13,841, referred to, discloses means whereby the value of a depressed key may be set up on selector gears and thereafter registered on the numeral wheels by rotation of the operating crank. The modifications necessary to adapt the construction therein disclosed to British currency fractions are disclosed in co-pending application, No. 560,360, and will now be described in brief:

Referring to Figure 2, the farthings rock-bar 65 is pivoted at 66 to the framing and has extensions 67 which are engageable by key stem cams 68. The rear end of the farthings rock bar 65 moves the farthings selector gear 69 (Figures 4 and 2) to the left upon the shaft 70, and this gear is provided with three teeth 71, 72, 73, of graded length or extent, whereby when the farthings selector gear has been moved appropriately by the ¼, ½ or ¾ key, one, two or three teeth will be brought into position to engage with the farthings intermediate gear 47 and advance or retract the farthings numeral wheel, according to the direction of rotation of the operating crank 25.

In the registration of pence, the one, two and three pence keys and the pence intermediate driving gear 47 function with a duplicate of farthings selector gear 69. There is also provided in registering pence a selector gear 74 (Figures 5 and 7) provided with eight teeth of graded length or extent, four longer teeth 79 and four shorter teeth 80. In the pence order there are two pence rock-bars 75 and 76, having angular extensions 78 and 81, respectively, with one or the other or both of which the different pence keys engage, by means of the key stem cams 68 and 77 (Figure 16), to impart the proper degree of movement to the pence selector gears.

All of the other selector rock-bars and selector gears of the machine are alike, and the latter may be similar to the selector gears just described or to those of said patent.

*Carriage release for British currency positioning.*

Referring to Figure 21, the carriage stop spring 82 is attached to the main frame extension 83, the carriage hinge rod 84 having free pivotal and sliding movement through the part 83 and through the coils of spring 82. A carriage detent 85 is pivotally connected at 86 with the end of the carriage housing, normally rests upon the rod 84 through gravity, and is provided at its free end with an arcuate or part-cylindrical extension 87, partially surrounding the rod 84. The free end of said detent (formed as stated) engages with the outer end of the carriage stop spring 82 whenever the carriage is shifted to the left to extreme left-hand decimal position, in which the carriage positioning pin 28 is located adjacent to the right-hand edge of the carriage-positioning bridge 27 (Figure 21.)

In order to move the carriage further to the left, into British currency position, it is necessary to raise the carriage detent 85, whereupon the carriage is free to move the two steps needed, and at the end of the said two steps the carriage stop spring 82 will engage the right-hand end of the carriage housing and stop the carriage from further movement in this direction. It is obvious that the carriage detent 85 would have a length equal to the said two steps of movement of the carriage, and that the spring 82 cushions the stop in both cases stated.

In order to raise the carriage detent 85 out of stop position, the lever 88 is fulcrumed to a carriage frame member at 88', and has its work arm adapted for engagement by operating pin 89, working within the carriage-lifting knob 90, said lever being provided with a spring 91 normally holding the lever out of action and the operating pin in its raised position.

In shifting the carriage transversely to the right or to the left from one decimal position to another or from British currency to decimal calculating position, the knob 90 may be grasped and the carriage raised slightly to disengage the numeral wheel gears from the intermediate gears of the main frame, when the carriage may be moved as required. The carriage cannot, however, be shifted from decimal position to British currency position without operating the pin 89 to raise the detent 85 as stated.

*British currency counter.*

In order to verify the number of additions or multiplications of British currency denominations, a numeral wheel 92 is provided in the carriage, in line with the usual upper row of counter numeral wheels (shown in Reissue Patent No. 13,841), to which it is similar except that it is provided with peripheral numbers from one to nineteen, inclusive, and zero, and with twenty radially extending gear teeth, whereas said aligned counting wheels have nineteen teeth and are operated by the counting finger one-nineteenth of a revolution. The wheel 92 therefore has its teeth made narrower, so that one-twentieth of a rotation is imparted thereto by the same movement of the counting finger.

If the registrations exceed twenty, the rotation of this wheel will be repeated, and it will still serve as a means of verification. If desired, however, one or more additional counter wheels may be associated with the wheel 92, and any of the well known carry mechanisms employed to carry from one wheel to the other and thereby increase the capacity.

*Description of operation.*

For decimal calculations, or calculations of uniform denomination, the method of operation is generally well known and needs no description here, being identical with that of similar machines not embodying the fractional, or non-uniform denomination mechanism.

A description of operation will be given sufficient to set forth the methods whereby this invention makes possible the working out of any British currency calculation (or a calculation in any fractional system for which the particular machine may be adapted) by either the fractional, or the decimal method. The methods here given are not to be considered complete, or as the best examples which might be cited, as the operation of such a machine may be developed into an elaborate art nearly as broad as the subject of mathematics, but merely as simple explanations for the purpose of establishing a broad basis for the claims.

*Addition and subtraction by fractional mechanism.*

The use of the fractional keys for adding British currency or fractional sums follows the well-known method of operating British currency adding machines, which have been in general use.

After setting the keys, operating crank 25 is rotated forward to register the addition or backward to register a subtraction, carriage 12 remaining in its fractional position throughout the problem.

*Addition and subtraction by decimal mechanism.*

It is not uncommon for persons using fractional systems, such as British currency, feet, and inches, etc., to be able to convert such values into decimal equivalents at sight. For example, 24 pounds, 17 shillings, 6½ pence equals £24.877. Also products and quotients frequently are obtained as decimals of British currency values. These decimal values may be of course added or subtracted in the usual way, ignoring the fractional keys and the fractional totalizer wheels. By this method, the carriage 12 should stand in one of its decimal positions as shown in Figure 21, in order to provide sufficient keyboard capacity.

Suppose it is desired to carry two columns in the machine at one time, as total debits, and total credits. In registering one classification, always place carriage 12 at extreme left, and utilize the fractional numeral wheels, in alignment with the fractional keys, which are depressed to register fractional values. Whenever an item of the other classification is to be registered, move the carriage to the extreme right and register each value in its decimal equivalent form. After the total of debits and the total of credits have been obtained, the lesser may be deducted by converting it into the decimal equivalent, or vice versa, and subtracting it from the greater. This method is especially desirable where it is not convenient to go through the work once to obtain a total of one classification, and a second time to totalize another classification.

Another method of adding fractional values on the decimal mechanism will be described as applied to a feet and inches machine, based on fractions in twelfths. With the carriage 12 shifted toward the right, in a decimal position, allow sufficient numeral wheels at the right to totalize the inches, say three wheels. The fourth column of decimal keys, and the corresponding numeral wheel will be used to register units of feet, the fifth, tens of feet, etc. After the feet and inches are totalized on the machine, divide the total of inches by twelve, using the well known method of repeatedly subtracting 12 by adding its complement, 88. In case three columns are allowed for inches, depress one 9 key at the left of 88 in carrying out the division, if four columns are allowed, depress two 9 keys, etc., in order to carry over the value in feet into the proper column. This division of the total of inches to reduce it into feet need not be deferred until the column is completely totalized in case the total of inches approaches a value whereby a decimal carry over is likely to occur onto the units of feet numeral wheel, but may be resorted to at any time during the addition of the column, repeating as often as necessary, the final reduction by division being made after the entire column is totalized. By this method, fractions of any denomination other than that provided by the fractional keys may be added, or subtracted, if desired, or two columns of fractions of the denomination of the fractional keys may be carried in the machine at the same time, using the fractional numeral wheels and corresponding keys for adding or subtracting fractional values with the carriage in its fractional position, and the decimal keys and decimal numeral wheels with the carriage shifted to the right in decimal position for adding or subtracting fractional values by the division reduction method just described.

*Multiplication by the decimal method.*

This operation is carried out precisely as on machines not equipped with fractional keys or numeral wheels. To find the value of 327 articles at 14 pounds, 16 shillings, 3 pence each, convert the money value into its decimal equivalent £14.8125, either by the use of a table or mentally, and multiply by 327 by the usual decimal method.

Another method of multiplying fractional values by the use of decimal mechanism of the machine exclusively greatly increases the product capacity of the machine, and enables the operator to determine at a glance whether or not the problem is within the capacity of the machine, a fact which is not easy to determine by the decimal equivalent method just given. Also the answer by this method is absolutely accurate to the smallest value, which is not apt to be true of the decimal equivalent method applied to large problems.

This method is here applied to an 8 place by 8 place by 16 place decimal capacity machine, as shown in Figure 1, and is illustrated by the following three problems:

*Problem #1.*

£   s.   d.     £   s.   d.
145—17—5×361.=52,659—7—5

Carriage at left decimal position, decimal points at 2 and 4 in lower dials. Multiply 361 by 5d. and divide by 12, using complement 88, which gives 150s.—05d. in the lower dial. Then with 3rd dial as units, multiply 361 by 17s. and divide by 20, using complement 80, which gives 314£—07s.—05d. Now with 5th dial as units, multiply 361 by 145, which gives the answer:

$$£ \quad s. \quad d.$$
$$52,659-07-05$$

*Problem #2.*

$$£ \quad s. \quad d. \qquad £ \quad s. \quad d.$$
$$136-14-11-1\tfrac{3}{8} \times 429 = 58,665-8-3-\tfrac{9}{16}$$

This problem is done exactly like the previous one except set decimals in lower dial at 2, 4 and 6, then multiply 429 by 13 and divide by 16 using complement 84, which gives 348 − 9%8 d. in the lower dial. Continue as above, multiplying 429 by 11d., etc. The answer appears fully in the lower dial, which reads:

$$£ \quad s. \quad d.$$
$$58,665-08-03-\tfrac{9\ 9}{1\ 6}$$

The following problems represent the capacity of the machine when using this method exactly as outlined:

```
    £       s.  d.          £                   s.  d.
999,999,999—19—11     ×   999,999—999,998,995,833— 6—  9
 99,999,999—19—11     ×     9,999—999,899,999,958— 6—  9
  9,999,999—19—11     ×99,999,999—999,999,999,573,333— 6→ 9
    999,999—19—11—⅛  ×    99,999— 99,998,999,947—18—  4-⅛
     99,999—19—11—1⅜ ×    99,999—  9,999,899,973—19—  2-⅞
```

Greater capacity may be obtained by a slight modification:—

*Problem #3.*

$$99,999,999-19-11-1\tfrac{3}{8} \times 99,999,999 =$$
$$9,999,999,899,973,958-6-8-\tfrac{1}{16}$$

Proceed by the above method until division by 20 shillings is reached, then use 20 instead of its complement 80 and 6—8—1⁄16 appears in the lower dials, with pounds in the upper. Copy 6—8—1⁄16 (shillings and pence) from the lower, as part of the final answer, and clear lower dials. Then bring down the pounds from the upper dial to the lower, using the first dial as units, then multiply 99,999,999 by 99,999,999 and copy the answer in pounds, which appears on the lower dials as 9,999,999,899,973,958.

Division by 20 (complement 80) is especially easy as the number of crank turns is apparent before starting to turn. The same is true of 12 (complement 88). The only other divisors are 8 and 16, with complements 92 and 84 respectively, halves and quarters of pence being handled decimally.

The reversal of this method accomplishes division of fractional values.

The above problem #3 sets forth clearly the almost unlimited capacity with absolute accuracy which this invention provides in a very moderate sized decimal and fractional calculator as shown in Figure 1, an achievement which is believed to be entirely new in the calculator art. That this method is wholly practical for large calculations is apparent from the fact that an operator may readily solve problem #3 in about two minutes' time.

*Fractional methods of multiplication.*

Many problems involving multiplication of fractional values may be worked out more readily by the use of the fractional keys and numeral wheels than by the use of the decimal mechanism exclusively. By the fractional method, the carriage 12 is always located in its fixed fractional position as shown in Figure 1.

To multiply a British currency value such as 1245 pounds 17 shillings 11 pence by 17, set up the money value on the pounds, shillings and pence keys, and turn the crank 17 times. The multiplier, 17, will be registered on counter wheel numbered 92. If the multiplier were 23 this counter wheel would register 3, having completed one revolution and made 3 steps over. Another method which might be utilized for somewhat larger multipliers would be as follows:

To multiply a British currency sum by say 45, set it up on the fractional keys, and multiply by 9, then clear the keys and copy the product dial reading to the keys and multiply by 5, which gives the product of the British currency sum by 45. To multiply by prime numbers, say 47, proceed as above to multiply by 45, then clear keyboard and set up British currency multiplicand in the keyboard, and add it in twice. Or, another way to multiply by 47, turn in the multiplicand 7 times, then copy the partial product and multiply that by 7, making 49, and then subtract the first multiplicand twice. Another method of utilizing the fractional mechanism for both small and large problems of multiplication of British currency values is as follows:

Set up British currency multiplicand on British currency keys. If the multiplier is 136, turn crank forward six times. Then reset keyboard to ten times its original setting and turn crank forward three times. Then reset keyboard to ten times the second setting and turn crank forward once. Persons familiar with British currency calculations can give at sight, ten times any British currency sum, therefore the resetting of the keys is a very simple matter. For persons less familiar with British currency values, the following simple tables which show ten times any shillings and pence value will be very helpful. It is to be noted that in setting up ten times any shillings value, the only shillings key operated is the 10 shillings key, whereas in setting up ten times any pence value, the 10 shillings key setting is not affected, which makes this method of multiplying by 10 exceedingly simple. The reversal of this method serves for division.

*Shillings and pence multiplied by 10.*

Shillings.

| s. £ s. | s. £ s. | s. £ s. | s. £ s. |
|---|---|---|---|
| 1=0–10 | 6=3 | 11=5–10 | 16= 8 |
| 2=1 | 7=3–10 | 12=6 | 17= 8–10 |
| 3=1–10 | 8=4 | 13=6–10 | 18= 9 |
| 4=2 | 9=4–10 | 14=7 | 19= 9–10 |
| 5=2–10 | 10=5 | 15=7–10 | 20=10 |

Pence.

| d. s. d. | d. s. d. | d. s. d. | d. s. d. |
|---|---|---|---|
| 1= 10 | 1½=1– 0½ | 1¼=1– 3 | 1¾=1– 5¼ |
| 2=1– 8 | 2½=1–10½ | 2¼=2– 1 | 2¾=2– 3¼ |
| 3=2– 6 | 3½=2– 8½ | 3¼=2–11 | 3¾=3– 1¼ |
| 4=3– 4 | 4½=3– 6½ | 4¼=3– 9 | 4¾=3–11¼ |
| 5=4– 2 | 5½=4– 4½ | 5¼=4– 7 | 5¾=4– 9¼ |
| 6=5 | 6½=5– 2½ | 6¼=5– 5 | 6¾=5– 7¼ |
| 7=5–10 | 7½=6– 0½ | 7¼=6– 3 | 7¾=6– 5¼ |
| 8=6– 8 | 8½=6–10½ | 8¼=7– 1 | 8¾=7– 3¼ |
| 9=7– 6 | 9½=7– 8½ | 9¼=7–11 | 9¾=8– 1¼ |
| 10=8– 4 | 10½=8– 6½ | 10¼=8– 9 | 10¾=8–11¼ |
| 11=9– 2 | 11½=9– 4½ | 11¼=9– 7 | 11¾=9– 9¼ |

*Fractional divisions by the use of the decimal mechanism.*

British currency, or other fractional values may be divided by converting them into decimal equivalents, as in multiplication, and then performing division by the usual decimal method as is common on machines not equipped with fractional numeral wheels and fractional keys.

It was also explained in connection with "multiplication by the decimal method" that the illustrative problems numbered 1, 2 and 3 might be worked by the reverse method to solve problems of division.

*Fractional division by the use of the fractional mechanism.*

Under the heading "Fractional methods of multiplication" it was explained that the last of these methods was reversible for the solution of fractional division problems. Another method of division may be illustrated as follows:

Divide 25,367 pounds, 15 shillings, 1 penny by 23. With carriage 12 in fractional position, place 25,367 pounds, 15 shillings, 1 penny, on the lower numeral wheels. Then shift carriage into a decimal position, and set up the divisor 23 at the extreme right, the units of shillings keys 16 now serving as units of decimal keys, and divide 23 into the pounds registered on the lower numeral wheels, by the usual decimal method, shifting the carriage 12 one place toward the left by carriage shifting knob 29 for each digit of the quotient. This shows 1102 pounds registered in the counter numeral wheels 93 and a remainder of 21 in the two right hand decimal numeral wheels. Now shift the carriage to fractional position, which releases the divisor 23 previously set, and continue as follows: We are now to divide in the shillings place, but 23 shillings which is our divisor, means one pound and three shillings, so set one pound, three shillings, on the keyboard by the fractional method, and turn the crank backward until the dividend wheels read less than one pound three shillings. This requires 18 crank turns, rotating counter 92 backward so that it will register 2, the difference between 20 and 18. The answer thus far is therefore 1102 pounds, 18 shillings, which should be noted, and the counting numeral wheels 92 and 93 cleared. Clear the keyboard, and continue to divide in the pence order. The divisor 23, in pence equals 1 shilling 11 pence, which is to be set up on the fractional keys. Again turn the crank 25 backwards until the dividend wheels register less than the keyboard setting, which requires eleven turns, this eleven being the pence value of the quotient, so the complete answer is 1102 pounds, 18 shillings, 11 pence.

It is to be noted that the solution of this last problem is facilitated by the combined use of the decimal method, and the fractional method in the one problem.

I claim:

1. In a register capable of distinctive operation to accomplish addition, subtraction, multiplication and division respectively, numeral wheels certain of which are marked according to one system and others according to a different system of numeraiton, selecting mechanism, and means for placing varying groups of numeral wheels under the control of said selecting mechanism.

2. In a register capable of distinctive operation to accomplish addition, subtraction, multiplication and division respectively, a transversely shiftable carriage, numeral wheels mounted thereon and certain of which are marked according to one system and others according to a different system of numeration, selecting mechanism, and means for shifting said cariage to place varying groups of numeral wheels under the control of said selecting mechanism.

3. In a multiple order calculating machine, numeral wheels certain of which are marked according to one system and others according to a different system of numeration, selecting mechanism, and means for placing varying groups of said numeral wheels under the control of said selecting mechanism.

4. In a multiple order calculating machine, a transversely shiftable carriage, numeral wheels mounted thereon and certain of which are marked according to one system and others according to a different system of numeration, selecting mechanism including banks of denominational keys, and means for shifting the carriage to place varying groups of numeral wheels under the control of said keys.

5. In a multiple order calculating machine, numeral wheels certain of which are fractionally marked and others decimally marked, selecting mechanism, means for placing varying groups of numeral wheels under the control of said selecting mechanism, and means for preventing a fractional numeral wheel from being shifted from the control of one order of selecting members to another.

6. In a multiple order calculating machine, fractionally marked and decimally marked numeral wheels, selecting mechanism including banks of denominational keys, means for placing a decimal wheel selectively in position to cooperate with one of several banks of keys, and means for preventing a fractional wheel from cooperating with more than one bank of keys.

7. In a multiple order calculating machine, numeral wheels certain of which are fractionally and others decimally marked, gears fixed upon said numeral wheels, driving gears normally in mesh with the numeral wheel gears, selecting mechanism including banks of fractionally marked and banks of decimally marked denominational keys, means for placing a decimal wheel selectively in position to cooperate with one of several banks of keys, means for holding the numeral wheel gears out of mesh with their driving gears, and means for locking the fractional keys, said means for holding or said locking means acting alternatively to prevent a fractional wheel from cooperating with more than one bank of keys.

8. In a multiple order calculating machine, numeral wheels certain of which are marked according to one system and others according to a different system of numeration, and selecting mechanism including devices related to a single order and cooperating selectively with differing numeral wheels.

9. In a multiple order calculating machine, a transversely shiftable carriage, numeral wheels mounted thereon and certain of which are marked according to one system and others according to a different system of numeration, selecting mechanism including banks of denominational keys, certain of said keys cooperating with differing numeral wheels in different positions of said carriage.

10. In a multiple order calculating machine, a transversely shiftable carriage, numeral wheels mounted thereon and certain of which are decimally and others fractionally marked, selecting mechanism including devices related to a lower and to a higher order, means for shifting the carriage to change the operative relation of a decimal wheel from said lower to said higher order devices, and means for preventing a fractional wheel from passing from operative relation to said lower order device into operative relation with said higher order device.

11. In a multiple order calculating machine, a transversely shiftable carriage having a projection, numeral wheels mounted on said carriage and certain of which are decimally and others fractionally marked, selecting mechanism including devices related to a lower and to a higher order, means for shifting the carriage to change the operative relation of a decimal wheel from said lower to said higher order devices, and a member upon the frame of the machine lying in the path of movement of the carriage projection and adapted to engage the same to prevent a fractional wheel from passing from operative relation to said lower order device into operative relation with said higher order device.

12. In a multiple order calculating machine, a transversely shiftable carriage having a projection, numeral wheels mounted on said carriage and certain of which are decimally and others fractionally marked, gears fixed upon said numeral wheels, driving gears mounted on the frame of the machine and normally meshing with the numeral wheel gears, selecting mechanism including devices related to a lower and to a higher order, means for shifting the carriage to change the operative relation of a decimal wheel from said lower to said higher order devices, and a member upon the frame of the machine lying in the path of movement of the carriage projection and adapted to engage the same to hold the numeral wheel gears out of mesh with the driving gears to prevent a fractional wheel from passing from operative relation to said lower order device into operative relation with said higher order device.

13. In a calculating machine, registering mechanism, actuating mechanism therefor, said registering mechanism including fractional numeral wheels selectively operable in an invariable position relative to the actuating mechanism and decimal wheels selectively operable in one of several positions relative to the actuating mechanism.

14. In a calculating machine, registering mechanism, actuating mechanism therefor, said registering mechanism including a transversely shiftable carriage, fractional numeral wheels mounted on said carriage and selectively operable in an invariable position thereof, and decimal numeral wheels mounted on said carriage and selectively operable in one of several shifted positions thereof.

15. In a calculating machine, registering mechanism, actuating mechanism therefor, said registering mechanism including a transversely shiftable carriage, fractional numeral wheels mounted on said carriage and selectively operable in an invariable position thereof, and decimal numeral wheels mounted on said carriage and selectively operable in one of several shifted positions thereof, and means for keeping the fractional wheels out of operative position with relation to said actuating mechanism until the carriage has arrived at said invariable position.

17. In a calculating machine, calculating devices, numeral wheels certain of which are marked according to one system and others according to a different system of numeration, shiftable means for bringing certain of the numeral wheels under the control of said devices, said means being shiftable to position occupied in the performance of fractional calculations, and means for obstructing the shifting to said position during the performance of decimal calculations.

17. In a calculating machine, calculating devices, a transversely shiftable carriage, numeral wheels mounted thereon and certain of which are marked according to one system and others according to a different system of numeration, said carriage being shiftable to position occupied in the performance of fractional calculations, and means for obstructing the shifting of said carriage to said position during the performance of decimal calculations.

18. In a calculating machine, selecting mechanism, a transversely shiftable carriage, numeral wheels mounted thereon and certain of which are marked according to one system and others according to a different system of numeration, said carriage being shiftable to position occupied in the performance of fractional calculations, means for shifting said carriage in the performance of decimal calculations, and means for preventing the shifting of the carriage to said position by said shifting means.

19. In a calculating machine, calculating devices, a transversely shiftable carriage, numeral wheels mounted thereon and certain of which are marked according to one system and others according to a different system of numeration, said carriage being shiftable to position occupied in the performance of fractional calculations, and means for obstructing the shifting of said carriage to said position during the performance of decimal calculations, comprising a member upon the carriage and a member upon the frame of the machine lying in the path of movement of the carriage member.

20. In a calculating machine, calculating devices, a transversely shiftable carriage, numeral wheels mounted thereon and certain of which are marked according to one system and others according to a different system of numeration, said carriage being shiftable to position occupied in the performance of fractional calculations, and means for obstructing the shifting of said carriage to said position during the performance of decimal calculations, comprising a member upon the carriage and a member upon the frame of the machine lying in the path of movement of the carriage member, one of said members including a yieldable cushioning element.

21. In a calculating machine, calculating devices, a transversely shiftable carriage, numeral wheels mounted thereon and certain of which are marked according to one system and others according to a different system of numeration, said carriage being shiftable to position occupied in the performance of fractional calculations, and means for obstructing the shifting of said carriage to said position during the performance of decimal calculations, comprising a member upon the carriage and a member upon the frame of the machine lying in the path of movement of the carriage member, one of said members including a yieldable cushioning element and the other member being pivotally movable into and out of position to engage said yieldable element.

22. In a calculating machine, calculating devices, a transversely shiftable carriage, numeral wheels mounted thereon and certain of which are marked according to one system and others according to a different system of numeration, said carriage being shiftable to position occupied in the performance of fractional calculations, and means for obstructing the shifting of said carriage to said position during the performance of decimal calculations, comprising a member upon the carriage and a member upon the frame of the machine lying in the path of movement of the carriage member, one of said members comprising a yieldable element adapted to cushion the carriage in its movement to said obstructed position or in its movement to fractional calculating position.

23. In a calculating machine, calculating devices, a transversely shiftable carriage, numeral wheels mounted thereon and certain of which are marked according to one system and others according to a different system of numeration, said carriage being shiftable to position occupied in the performance of fractional calculations, and means for obstructing the shifting of said carriage to said position during the performance of decimal calculations, comprising a member upon the frame of the machine, a member pivotally mounted upon the carriage and lying normally in position to contact with said frame member, and means for moving said pivoted member from normal position, including a lever adapted for manual operation.

24. In a calculating machine, registering mechanism including fractional numeral wheels and decimal numeral wheels, selective actuating mechanism including fractional members and decimal members, said registering mechanism being shiftable with relation to the actuating mechanism and the fractional actuating members being adapted to permit the replacement of cooperating fractional numeral wheels by idle decimal numeral wheels during decimal calculations.

25. In a calculating machine, registering mechanism including a transversely shiftable carriage, fractional numeral wheels and decimal numeral wheels mounted thereon, selective actuating mechanism including fractional members adapted to permit the replacement of cooperating fractional numeral wheels by idle decimal numeral wheels upon shifting of said carriage.

26. In a key-set calculating machine, numeral wheels certain of which are marked according to one system and others according to a different system of numeration, selecting mechanism including depressible keys, shiftable means for bringing varying groups of numeral wheels under the control of said selecting mechanism to adapt the machine to operate according to varying systems of numeration, means for locking a plurality of said keys in depressed position, and automatic means for releasing all depressed keys upon operation of said shiftable means.

27. In a key-set calculating machine, a transversely shiftable carriage, numeral wheels mounted thereon and certain of which are marked according to one system and others according to a different system of numeration, selecting mechanism including depressible keys, said carriage being shiftable to bring varying groups of numeral wheels under the control of the selecting mechanism to adapt the machine to operate according to varying systems of numeration, means for locking a plurality of said keys in depressed position, and automatic means for releasing all depressed keys upon shifting of said carriage.

28. In a key-set calculating machine, a transversely shiftable carriage, fractional numeral wheels and decimal numeral wheels mounted thereon, selecting mechanism including depressible keys, said carriage being shiftable to bring varying groups of numeral wheels under the control of the selecting mechanism to adapt the machine to operate according to the fractional or decimal system of numeration, means for locking a plurality of said keys in depressed position, and automatic means for releasing all depressed keys when said carriage is shifted to fractional registering position.

29. In a key-set calculating machine, a transversely shiftable carriage, numeral wheels mounted thereon and certain of which are marked according to one system and others according to a different system of numeration, selecting mechanism including depressible keys, said carriage being shiftable to bring varying groups of numeral wheels under the control of the selecting mechanism to adapt the machine to operate according to varying systems of numeration, means for locking a plurality of said keys in depressed position, and automatic means for releasing all depressed keys upon shifting of said carriage, including a member upon said carriage, means for restricting the movement of said member to a given path in shifting from one system of numeration to the other, and a releasing member lying in said path.

30. In a key-set calculating machine, a transversely shiftable pivoted carriage, numeral wheels mounted thereon and certain of which are marked according to one system and others according to a different system of numeration, selecting mechanism including depressible keys, said carriage being shiftable to bring varying groups of numeral wheels under the control of the selecting mechanism to adapt the machine to operate according to varying systems of numeration, means for locking a plurality of said keys in depressed position, and automatic means for releasing all depressed keys upon shifting of said carriage, including a member upon said carriage, means including a plate upon the frame of the machine for restricting the movement of said member to a given path in shifting from one system of numeration to the other, and a releasing lever having a cam portion normally projecting beyond said plate and lying in said path.

31. In a key-set calculating machine, a transversely shiftable carriage, numeral wheels mounted thereon and certain of which are marked according to one system and others according to a different system of numeration, selecting mechanism including depressible keys, said carriage being shiftable to bring varying groups of numeral wheels under the control of the selecting mechanism to adapt the machine to operate according to varying systems of numeration, means for locking a plurality of said keys in depressed position, a transversely slidable bar operable to release all keys so locked, and automatic means for operating said release bar upon shifting of said carriage, including a lever engaging said bar and having a cam portion, and a projection upon the carriage engageable with said cam portion.

32. In a key-set calculating machine, numeral wheels certain of which are marked according to one system and others according to a different system of numeration, selecting mechanism including depressible keys, shiftable means for bringing varying groups of numeral wheels under the control of said selecting mechanism to adapt the machine to operate according to varying systems of numeration, means for locking a key in depressed position, and automatic means for releasing said key and for locking it in normal raised position upon operation of said shiftable means.

33. In a key-set calculating machine, a transversely shiftable carriage, numeral wheels mounted thereon and certain of which are marked according to one system and others according to a different system of numeration, selecting mechanism including depressible keys, said carriage being shiftable to bring varying groups of numeral wheels under control of said selecting mechanism to adapt the machine to operate according to varying systems of numeration, means for locking a key in depressed position, and automatic means for releasing said key and for locking it in its normal raised position upon shifting of said carriage.

34. In a key-set calculating machine, a transversely shiftable pivoted carriage having a projection, numeral wheels mounted on said carriage and certain of which are marked according to one system and others according to a different system of numeration, selecting mechanism including depressible keys, said carriage being shiftable to bring varying groups of numeral wheels under control of said selecting mechanism to adapt the machine to operate according to varying systems of numeration and the carriage projection being raised during said shifting, means for locking a key in depressed position, and automatic means for releasing said key and for locking it in normal raised position upon shifting of said carriage, including a relocking member engageable by said projection in falling from raised position.

35. In a key-set calculating machine, a transversely shiftable pivoted carriage having a projection, numeral wheels mounted on said carriage and certain of which are marked according to one system and others according to a different system of numeration, selecting mechanism including depressib'e keys, said carriage being shiftable to bring varying groups of numeral wheels under control of said selecting mechanism to adapt the machine to operate according to varying systems of numeration and the carriage projection being raised during said shifting, means for locking a key in depressed position, and automatic means for releasing said key and for locking it in normal raised position upon shifting of said carriage, including a relocking member engageable by said projection in falling from raised position and a spring member adapted to permit the projection to fall while a key is depressed.

36. In a key-set calculating machine, a transversely shiftable pivoted carriage having a projection, numeral wheels mounted on said carriage and certain of which are marked according to one system and others according to a different system of numeration, selecting mechanism including depressible keys, said carriage being shiftable to bring varying groups of numeral wheels under control of said selecting mechanism to adapt the machine to operate according to varying systems of numeration, means for locking a key in depressed position, and automatic means for releasing said key and for locking it in normal raised position upon shifting of said carriage, including an element lying in the normal path of movement of said carriage projection, and a relocking member having a cam portion adjacent to one lateral edge of said element and adapted for engagement by said projection.

37. In a key-set calculating machine, a transversely shiftable carriage having a projection, numeral wheels mounted on said carriage and certain of which are marked according to one system and others according to a different system of numeration, selecting mechanism including depressible keys, said carriage being shiftable to bring varying groups of numeral wheels under control of said selecting mechanism to adapt the machine to operate according to varying systems of numeration, means for locking a key in depressed position, and automatic means for releasing said key and for locking it in normal raised position upon shifting of said carriage, including a releasing member engaged by said carriage projection in the shifting movement to and from a given position of said carriage, and a spring relocking member engaged and tensioned by the projection in said given position.

38. In a key-set calculating machine, a transversely shiftable carriage having a projection, numeral wheels mounted on said carriage and certain of which are marked according to one system and others according to a different system of numeration, selecting mechanism including depressible keys, said carriage being shiftable to bring varying groups of numeral wheels under control of said selecting mechanism to adapt the machine to operate according to varying systems of numeration, means for locking a key in depressed position, and automatic means for releasing said key and for locking it in normal raised position upon shifting of said carriage, including an element having two angularly disposed marginal edges, means for holding said carriage extension adjacent to said edges in passing over said element, a releasing member having a cam portion projecting beyond one marginal edge of said element, and a relocking member having a cam portion projecting beyond the other marginal edge of said element.

39. In a multiple order calculating machine, a transversely shiftable carriage, fractionally marked numeral wheels and decimally marked numeral wheels mounted thereon, carry mechanism between each two adjacent wheels, selecting mechanism including banks of decimal denominational keys and banks of fractional denominational keys, and means for automatically locking the fractional keys when said carriage is shifted to bring the lowest order decimal wheel into decimal calculating position.

40. In a multiple order calculating machine, a transversely shiftable carriage, fractionally marked numeral wheels and decimally marked numeral wheels mounted thereon, carry mechanism between each two adjacent wheels, selecting mechanism including banks of decimal denominational keys and banks of fractional denominational keys, and means for automatically locking certain of the decimal keys when the carriage is shifted to fractional calculating position from position with the lowest order decimal wheel in decimal calculating position.

41. In a multiple order calculating machine, a transversely shiftable carriage, fractionally marked numeral wheels and decimally marked numeral wheels mounted thereon, carry mechanism between each two adjacent wheels, selecting mechanism including banks of decimal denominational keys and banks of fractional denominational keys, and means for automatically locking the fractional keys when said carriage is shifted to bring the lowest order decimal wheel into decimal calculating position, said locking means operating also to lock certain of the decimal keys when the carriage is shifted to fractional calculating position from position with the lowest order decimal wheel in decimal calculating position.

42. In a calculating machine, a transversely shiftable carriage, fractional numeral wheels and decimal numeral wheels mounted thereon, selecting mechanism including depressible keys, said carriage being shiftable to bring varying groups of numeral wheels under control of the selecting mechanism to adapt the machine to operate according to the fractional or decimal system of numeration, means for locking a plurality of said keys in depressed position, and means for releasing all depressed keys when said carriage is shifted to fractional registering position and for locking certain of the keys against operation when the carriage is shifted to decimal registering position.

43. In a calculating machine, a transversely shiftable carriage having a projection, fractional numeral wheels and decimal numeral wheels mounted thereon, selecting mechanism including depressible keys, said carriage being shiftable to bring varying groups of numeral wheels under control of the selecting mechanism to adapt the machine to operate according to the fractional or decimal system of numeration, means for locking a plurality of said keys in depressed position, and means including an element located in the normal path of movement of said carriage projection for releasing all depressed keys when said carriage is shifted to fractional registering position and for locking certain of the keys against operation when the carriage is shifted to decimal registering position.

44. In a calculating machine, a transversely shiftable carriage, fractional numeral wheels and decimal numeral wheels mounted thereon, selecting mechanism including depressible keys, said carriage being shiftable to bring varying groups of numeral wheels under control of the selecting mechanism to adapt the machine to operate according to the fractional or decimal system of numeration, means for locking a plurality of said keys in depressed position, and means for releasing all depressed keys when said carriage is shifted to fractional registering position and for keeping the numeral wheels out of operative position with relation to the keys during said shifting.

45. In a calculating machine, a transversely shiftable carriage having a projection, fractional numeral wheels and decimal numeral wheels mounted thereon, selecting mechanism including depressible keys, said carriage being shiftable to bring varying groups of numeral wheels under control of the selecting mechanism to adapt the machine to operate according to the fractional or decimal system of numeration, means for locking a plurality of said keys in depressed position, and means including an element located in the normal path of movement of said carriage projection for releasing all depressed keys when said carriage is shifted to fractional registering position and for keeping the numeral wheels out of operative position with relation to the keys during said shifting.

46. In a calculating machine, a transversely shiftable carriage, fractional numeral wheels and decimal numeral wheels mounted thereon, selecting mechanism including depressible keys, said carriage being shiftable to bring varying groups of numeral wheels under control of the selecting mechanism to adapt the machine to operate according to the fractional or decimal system of numeration, and means for locking certain of the keys against operation when the carriage is shifted to decimal registering position and for keeping the numeral wheels out of operative position during said shifting.

47. In a calculating machine, a transversely shiftable carriage having a projection, fractional numeral wheels and decimal numeral wheels mounted thereon, selecting mechanism including depressible keys, said carriage being shiftable to bring varying groups of numeral wheels under control of the selecting mechanism to adapt the machine to operate according to the fractional or decimal system of numeration, and means including an element located in the normal path of movement of said carriage projection for locking certain of the keys against operation when the carriage is shifted to decimal registering position and for keeping the numeral wheels out of operative position during said shifting.

48. In a calculating machine, a transversely shiftable carriage, fractional numeral wheels and decimal numeral wheels mounted thereon, selecting mechanism including depressible keys, said carriage being shiftable to bring varying groups of numeral wheels under control of the selecting mechanism to adapt the machine to operate according to the fractional or decimal system of numeration, means for locking a plurality of said keys in depressed position, and means for releasing all depressed keys when said carriage is shifted to fractional registering position, for locking certain of the keys against operation when the carriage is shifted to decimal registering position and for keeping the numeral wheels out of operative position during said shifting.

49. In a calculating machine, a transversely shiftable carriage having a projection, fractional numeral wheels and decimal numeral wheels mounted thereon, selecting mechanism including depressible keys, said carriage being shiftable to bring varying groups of numeral wheels under control of the selecting mechanism to adapt the machine to operate according to the fractional or decimal system of numeration, means for locking a plurality of said keys in depressed position, and means including an element located in the normal path of movement of said carriage projection for releasing all depressed keys when said carriage is shifted to fractional registering position, for locking certain of the keys against operation when the carriage is shifted to decimal registering position and for keeping the numeral wheels out of operative position during said shifting.

50. In a key-set calculating machine, selecting mechanism including a keyboard provided with banks of denominational keys, registering mechanism including fractional numeral wheels selectively operable in an invariable position relative to the selecting mechanism and decimal wheels selectively operable in one of several positions relative to the selecting mechanism, and means for automatically marking a decimal point upon said keyboard when said fractional wheels are brought into said invariable operative position.

51. In a key-set calculating machine, selecting mechanism including a keyboard provided with banks of denominational keys, registering mechanism including a transversely shiftable carriage, fractional numeral wheels mounted on said carriage and selectively operable in an invariable position thereof, and decimal numeral wheels mounted on said carriage and selectively operable in one of several shifted positions thereof, and means for automatically marking a decimal point upon said keyboard when the carriage is brought into said invariable fractional registering position.

52. In a key-set calculating machine, selecting mechanism including a keyboard provided with banks of denominational keys, registering mechanism including a transversely shiftable carriage, fractional numeral wheels mounted on said carriage and selectively operable in an invariable position thereof, and decimal numeral wheels mounted on said carriage and selectively operable in one of several shifted positions thereof, means for automatically marking a decimal point upon said keyboard when the carriage is brought into said invariable fractional registering position, and means for marking the same decimal point at will when the carriage is in a position other than said invariable fractional registering position.

53. In a key-set calculating machine, selecting mechanism including a keyboard provided with banks of denominational keys, registering mechanism including a transversely shiftable carriage, fractional numeral wheels mounted on said carriage and selectively operable in an invariable position thereof, and decimal numeral wheels mounted on said carriage and selectively operable in one of several shifted positions thereof, means including a pivoted element for automatically marking a decimal point upon said keyboard when the carriage is brought into said invariable fractional registering position, and a pivoted element for marking the same decimal point at will when the carriage is in a position other than said invariable fractional registering position, said elements having a common pivotal point and being separately movable thereabout.

54. In a key-set calculating machine, selecting mechanism including a keyboard provided with banks of denominational keys, registering mechanism including a transversely shiftable carriage, fractional numeral wheels mounted on said carriage and selectively operable in an invariable position thereof, and decimal numeral wheels mounted on said carriage and selectively operable in one of several shifted positions thereof, means including a pivoted element for automatically marking a decimal point upon said keyboard when the carriage is brought into said invariable fractional registering position, and a pivoted element having cam-operated connection with said transversely shiftable carriage for marking the same decimal point at will when the carriage is in a position other than said invariable fractional registering position, said element having a common pivotal point and being separately movable thereabout.

55. In a key-set calculating machine, selecting mechanism including a keyboard provided with banks of denominational keys, registering mechanism including fractional numeral wheels selectively operable in an invariable position relative to the selecting mechanism and decimal wheels selectively operable in one of several positions relative to the selecting mechanism, and means for automatically marking a decimal point upon said keyboard when said fractional wheels are brought into said invariable operative position and for erasing said marking when the fractional wheels are brought out of said invariable operative position.

56. In a key-set calculating machine, selecting mechanism including a keyboard provided with banks of denominational keys, registering mechanism including a transversely shiftable carriage, fractional numeral wheels mounted on said carriage and selectively operable in an invariable position thereof, and decimal numeral wheels mounted on said carriage and selectively operable in one of several shifted positions thereof, and means for automatically marking a decimal point upon said keyboard when the carriage is brought into said invariable fractional registering position and for erasing said marking when the carriage is brought out of said fractional registering position, including a member adapted for engagement by said carriage and functioning also to permit certain of said keys to be locked against operation only when the carriage is out of said fractional registering position.

57. In a calculating machine, a transversely shiftable carriage, numeral wheels mounted thereon and certain of which are marked according to one system and others according to a different system of numeration, selecting members, means for shifting said carriage to bring varying groups of numeral wheels under control of the selecting members, and an operating means for the numeral wheels common to all of the selecting members.

58. In a calculating machine, a transversely shiftable carriage, numeral wheels mounted thereon and certain of which are marked according to one system and others according to a different system of numeration, selecting members, means for shifting said carriage to bring varying groups of numeral wheels under control of the selecting members, an operating means for the numeral wheels common to all of the selecting members, and means for counting the cycles of operation of said operating means, including counting wheels on said carriage and one of which is provided with a given number of characters and others of which are provided with a different number of characters, and a member driven by said operating means and having operating engagement alternatively with one or the others of said wheels.

59. In a calculating machine, series of numeral wheels, varying ratio drive gearing therefor including series of varying numeral wheel gears and series of varying selector gears, the gearing of variable ratio being simultaneously operable in a fixed relative position, and means for shifting the relative position of the gears during operations involving single ratio gearing only.

60. In a calculating machine, a transversely shiftable carriage, series of numeral wheels mounted thereon, varying ratio driving gearing for the wheels of said series including series of varying numeral wheel gears mounted on said carriage, and series of varying selector gears mounted on the frame of the machine, the gearing of variable ratio being simultaneously operable in a fixed position of said carriage, and a series of numeral wheel gears and of selector gears of a single gear ratio being operable in any one of several shifted positions of said carriage.

In testimony whereof I affix my signature in presence of two witnesses.

GEORGE C. CHASE.

Witnesses:
LEE R. BROWN,
CLARENCE S. BUTLER.